United States Patent [19]
Oster

[11] 3,943,316
[45] Mar. 9, 1976

[54] CURRENT LIMITING CIRCUIT BREAKER

[75] Inventor: Clark L. Oster, Cedar Rapids, Iowa

[73] Assignee: Square D Company, Park Ridge, Ill.

[22] Filed: Apr. 29, 1974

[21] Appl. No.: 465,398

[52] U.S. Cl. .................. 200/337; 74/548; 200/336; 403/255
[51] Int. Cl.² ........................................ H01H 21/18
[58] Field of Search ............... 335/8, 9, 10, 191, 23, 335/46, 35; 337/7, 6, 89; 74/548; 403/254, 255, 263; 200/337, 336

[56] References Cited
UNITED STATES PATENTS

| | | | |
|---|---|---|---|
| 2,317,070 | 4/1943 | Tourneau | 403/255 |
| 2,439,084 | 4/1948 | Graves | 200/336 |
| 3,202,775 | 8/1965 | Tillson | 200/336 |

*Primary Examiner*—Harold Broome
*Attorney, Agent, or Firm*—Harold J. Rathbun; Ernest S. Kettelson

[57] ABSTRACT

A current limiting circuit breaker having for each pole, a pair of main contacts separable upon operation of a thermally and electromagnetically operable tripping device and a pair of auxiliary contacts for current limiting in series with the main contacts and in parallel with a transformable resistor having a positive temperature coefficient of resistance. The auxiliary contacts are separable when an electromagnet is energized by a fault current which simultaneously energizes a field magnet to produce a transverse magnetic field across the auxiliary contacts and the arc formed between them when separating. This simultaneous action of electromagnet and field magnet coacting for rapid contact separation and lengthening of the arc upon flow of a fault current serves to increase arc voltage almost instantaneously to that of the source, about which time the fault current is totally shunted into the resistor. One of the main contacts of each pole is carried by a movable contact blade. The contact blades have tapered mounting end portions which extend through an elongated molded plastic crossbar, the movable contact blade for each pole being mounted in spaced apart relation in the common crossbar. A metallic insert is embedded in the molded plastic crossbar, the metallic insert having spaced apart openings located to permit the tapered mounting end of the contact blades to extend therethrough.

3 Claims, 35 Drawing Figures

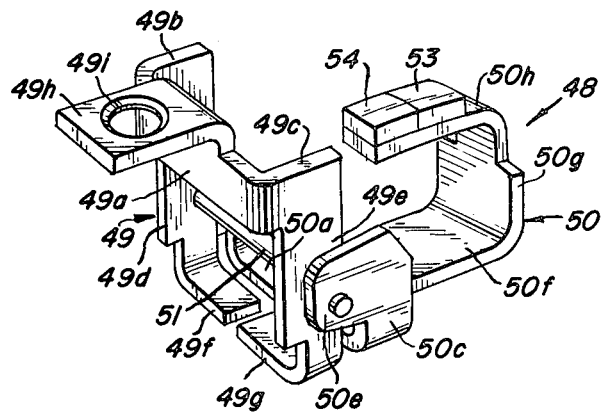
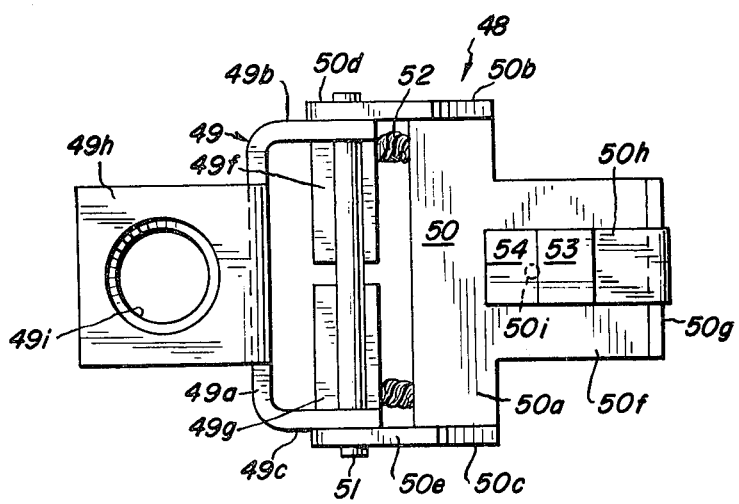
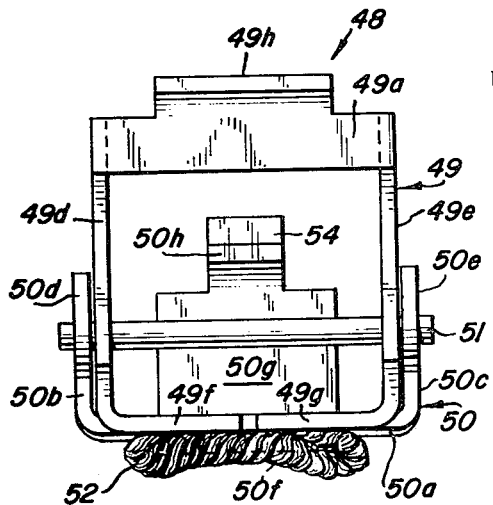

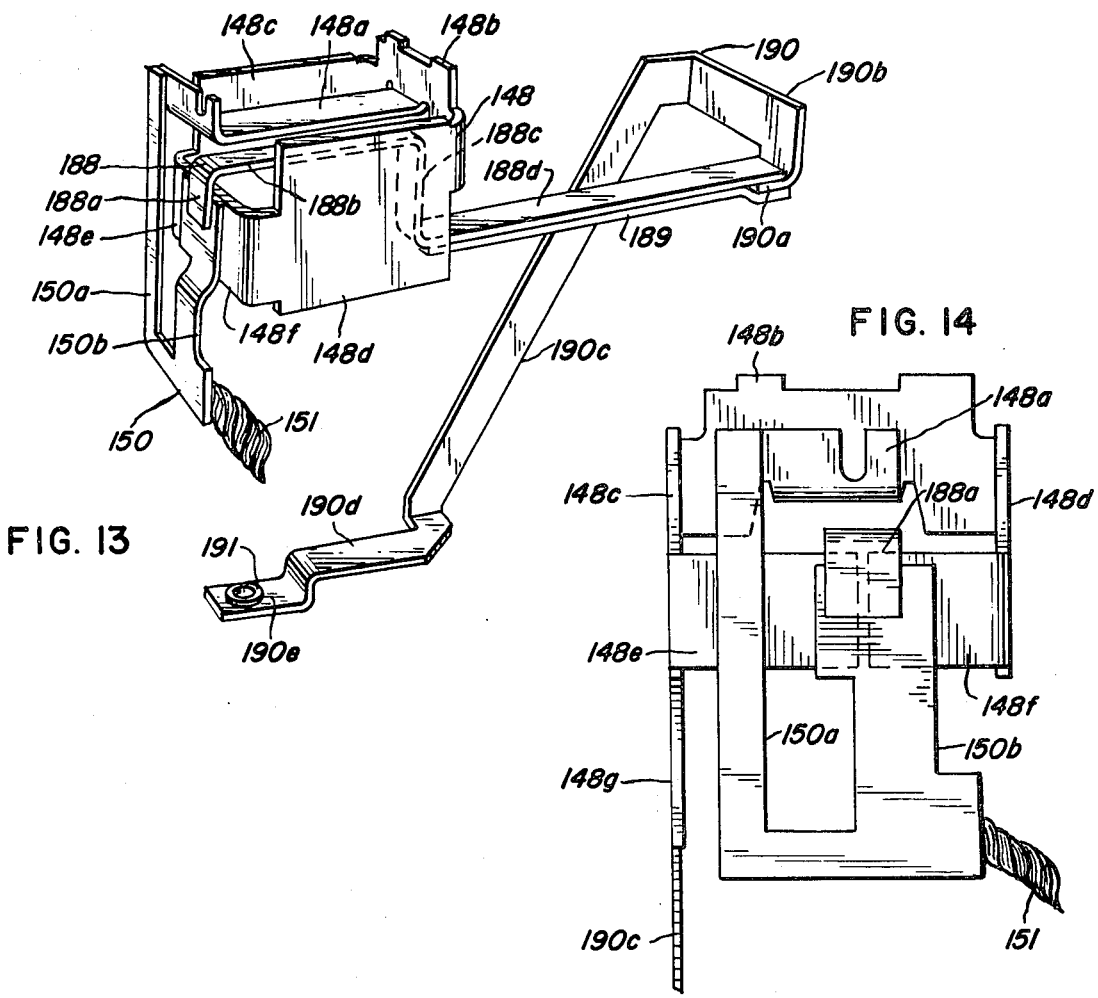
FIG. 13
FIG. 14
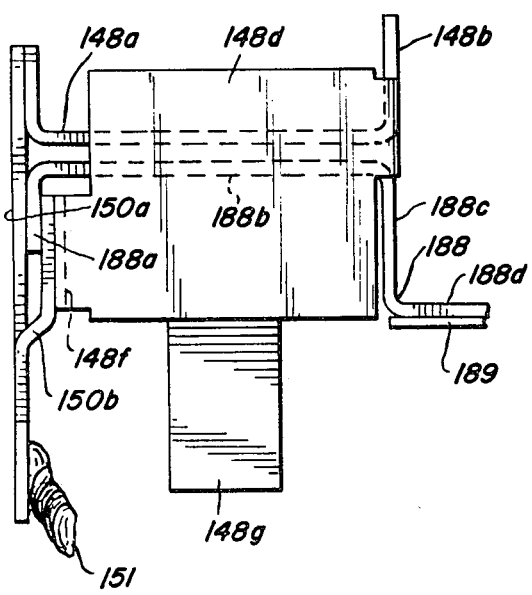
FIG. 15
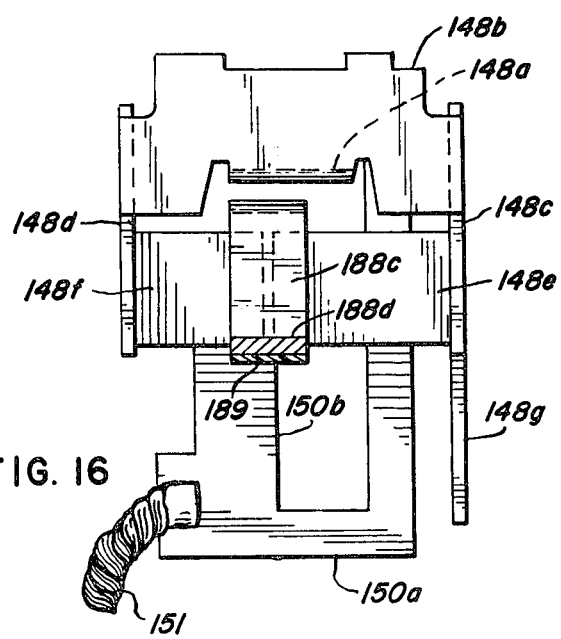
FIG. 16

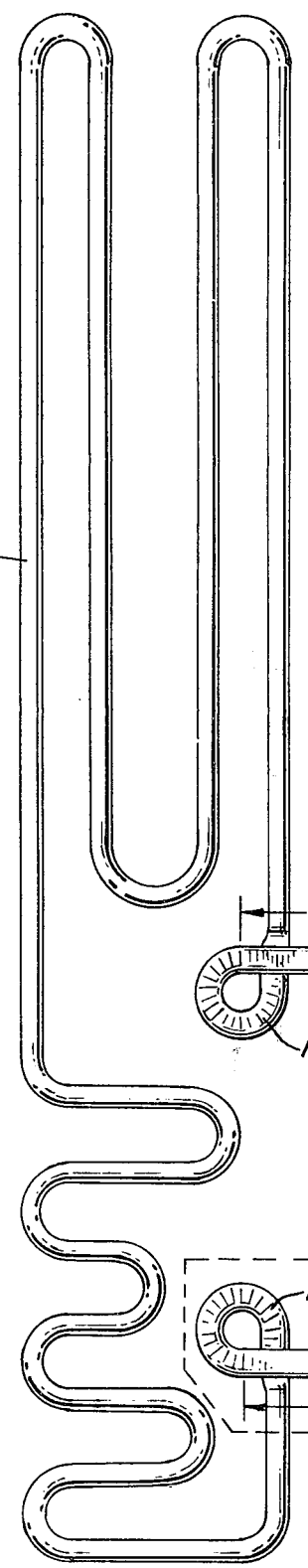
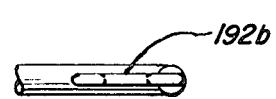
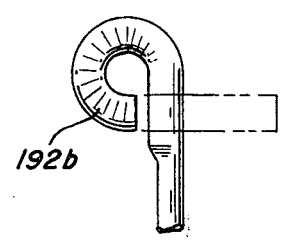
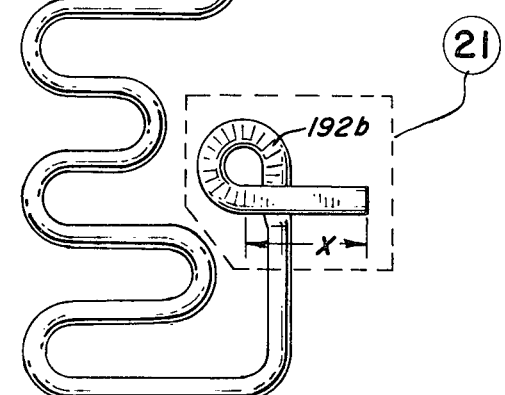
FIG. 20
FIG. 22
FIG. 21

3,943,316

CURRENT LIMITING CIRCUIT BREAKER

BACKGROUND OF THE INVENTION

Before the present invention, a commercially practical current limiting circuit breaker suitable for use in low voltage power distribution systems of about 600 volts or less had been sought by the power distribution and control industry for over 30 years. Various, sometimes conflicting requirements have to be met. For example, a commercially practical current limiting circuit breaker (a) must be repetitively operable at its maximum short circuit interrupting rating without repair of replacement of parts (This requirement precludes the use of fuses, fused switches, or fused circuit breakers for achieving current limiting.); (b) must not have a temperature rise at the terminals of more than 50° Centigrade at rated steady state current to meet appropriate standards of safety and performance established for circuit breakers used in power distribution systems of 600 volts or less (This requirement precludes the use of a large built-in resistance to limit current.); (c) must have a design applicable to a wide range of steady state current ratings, from a few amperes to hundreds of amperes; (d) must have current limiting capabilities competitive with those of the best available other current limiting devices including fuses (This requires that the device will operate in a fraction of a millisecond when the available short circuit current is 100,000 amperes or more.); (e) must be compact enough to fit into existing circuit breaker panelboards (This requires that the ratio of interrupting rating to volume be equal to or greater than that for any prior circuit breaker.); (f) must use non-toxic, non-hazardous materials; (g) must have a response time which decreases proportionately as much as or faster than available short circuit current is increased; (h) must be economically competitive with present circuit protective devices; and (i) must function without inducing severe transient voltages. None of the prior current limiting circuit breakers meets all the above requirements.

SUMMARY OF THE INVENTION

An object of the invention is to provide a current limiting circuit breaker which meets all the above requirements.

Another object is to provide a current limiting circuit breaker including a pair of main contacts, electromagnetically and thermally operable tripping means for opening the pair of main contacts, a pair of auxiliary contacts for current limiting in series with the pair of main contacts, electromagnetically operable means for opening the pair of auxiliary contacts, a field magnet associated with the pair of auxiliary contacts, and a resistor connected in parallel with the pair of auxiliary contacts, the resistor having a positive temperature coefficient of resistance and the parallel circuit through the resistor including a pair of conductor turns associated with the field magnet.

A further object is to provide an improved, fast acting mechanism for opening the pair of auxiliary contacts of such a current limiting circuit breaker.

Still another object is to provide an improved conductor-turn arrangement for the electromagnetically operable means for opening the pair of auxiliary contacts of such a current limiting circuit breaker.

Yet another object is to provide an improved field magnet structure for the pair of auxiliary contacts of such a circuit limiting circuit breaker.

A still further object is to provide an improved electromagnetically and thermally operable tripping means for the pair of main contacts of such a current limiting circuit breaker.

Another object is to provide an improved movable contact blade mounting arrangement for the pair of main contacts of such a current limiting circuit breaker.

An additional object is to provide a current limiting circuit breaker having means to rapidly increase the voltage drop across the arc formed between the auxiliary contacts in the current limiting section to a value which equals the supply voltage of the source in substantially less than a quarter cycle and in about one millisecond of time, thus checking any further rise in current and almost simultaneously shunting the current through a current limiting resistor connected in parallel with the current limiting contacts. This section increases the power factor to near unity thereby enabling interruption of a potentially high fault current in less than one-quarter cycle of current.

An additional object is to provide a current limiting circuit breaker wherein means to rapidly increase arc voltage between auxiliary contacts to equal the voltage of the source includes electromagnetic means to rapidly separate and lengthen the gap between said contacts, first magnet means to simultaneously produce magnetic lines of force to rapidly move said contacts apart in divergent directions and to blow the arc between said contacts in a third direction away therefrom, causing an additional lengthening of the arc and cooling thereof, thus rapidly increasing arc resistance to raise the arc voltage to that of the source, until saturation said electromagnetic means being operative to increase speed of action proportional to the increase in value of the square of the through fault current, and likewise until saturation said field magnet means being operative to increase the speed of action also with the square of the increase in value of the through fault current.

An additional object is to provide a current limiting circuit breaker including means to prevent opening of the auxiliary contacts below a threshold fault current of a selected magnitude.

Other objects and advantages will become apparent when the following specification is considered along with the accompanying drawings.

BRIEF DESCRIPTION OF THE DRAWINGS

FIGS. 3, 4, 5, and 6 are enlarged perspective, top, side, and outer end views, respectively, of a line terminal and stationary contact support assembly of any one of the poles of the current limiting circuit breaker of FIG. 1;

FIGS. 13, 14, 15, and 16 are perspective, left end, side, and right end views, respectively, of an assembly of electrical conductors associated with an electromagnet in a current limiting portion of any one of the poles of the current limiting circuit breaker of FIG. 1, portions being broken away or omitted in FIGS. 14, 15, and 16.

FIG. 20 is a plan view of an unfinished current limiting resistor for any one of the poles of the current limiting circuit breaker of FIG. 1, the unfinished resistor including end portions to be cut off after electroplating;

FIG. 21 is a plan view of the end portion of the resistor within the dotted enclosure 21 of FIG. 20, the broken line portion in FIG. 21 indicating a portion which is cut away after electroplating;

FIG. 22 is an edge view of the resistor end portion;

DETAILED DESCRIPTION OF PREFERRED EMBODIMENT

Figure 1:
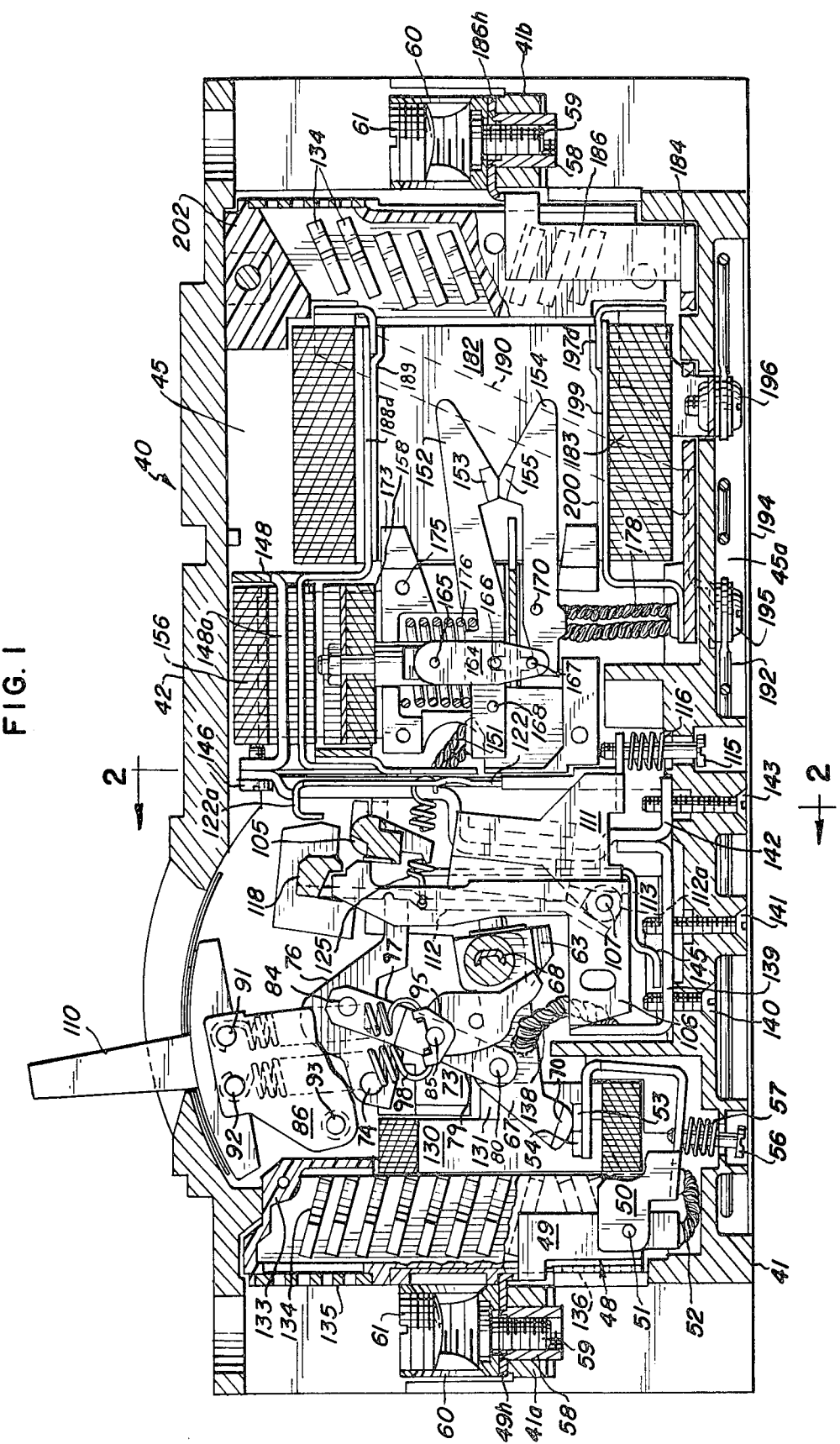
FIG. 1 is a longitudinal sectional view of a three-pole current limiting circuit breaker constructed in accordance with the invention, taken generally along the line 1—1 of FIG. 2 and showing a center pole thereof with parts in an ON position.
Figure 2:
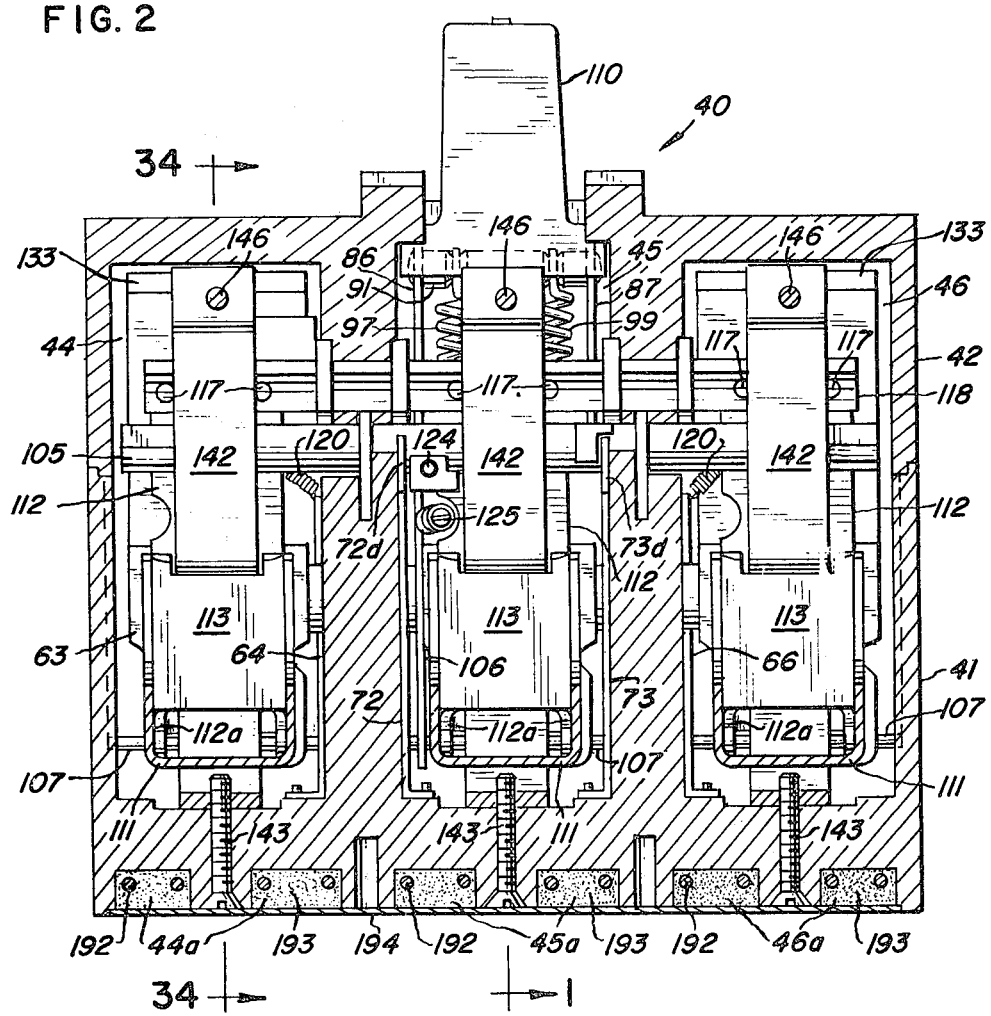
FIG. 2 is a cross sectional view of the current limiting circuit breaker of FIG. 1, taken generally along the line 2—2 of FIG. 1.
Figure 34:
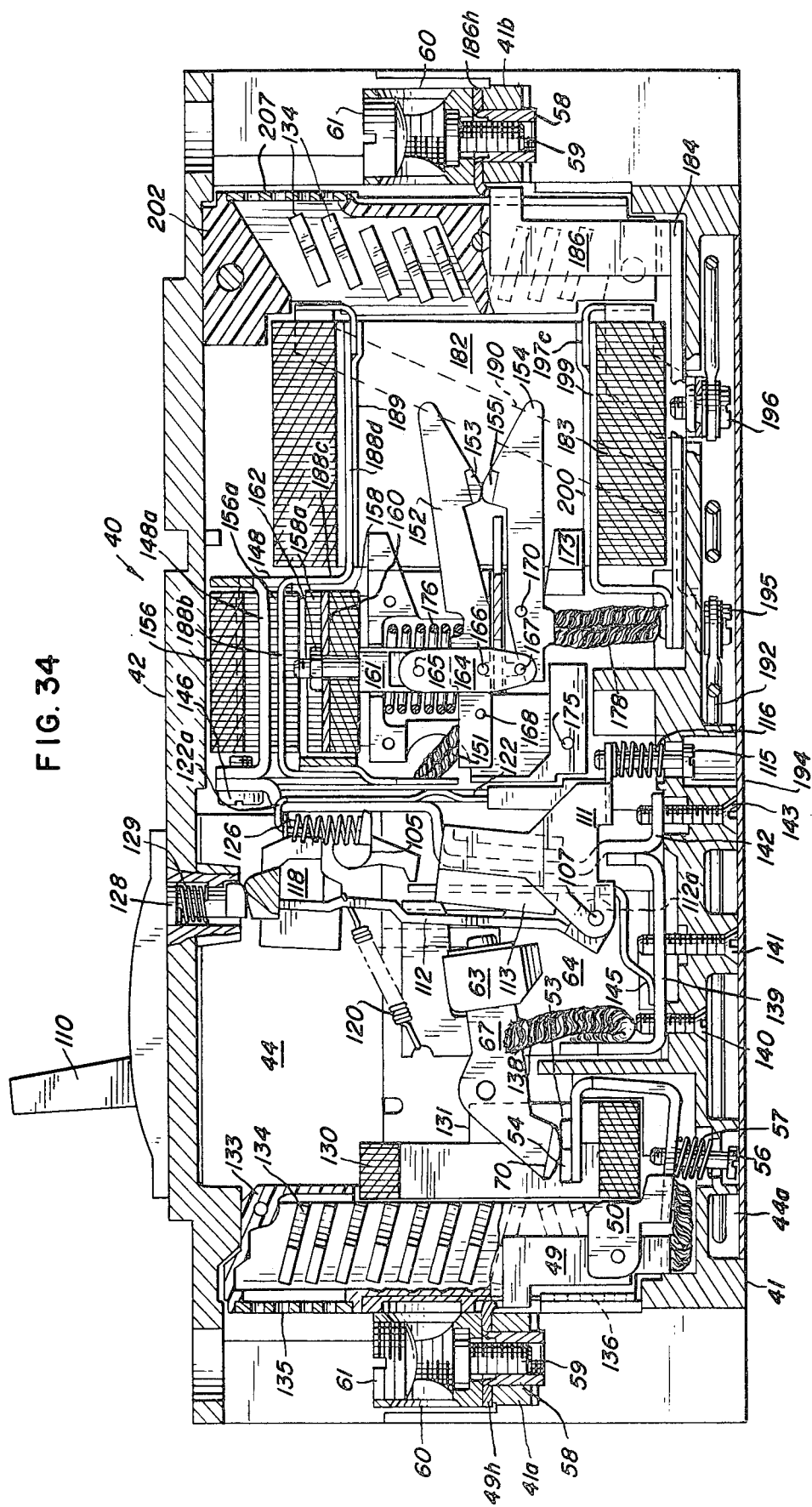
FIG. 34 is a longitudinal sectional view of the current limiting circuit breaker of FIG. 1, taken generally along the line 34—34 of FIG. 2 and showing an outer pole thereof with parts in an ON position.
Figure 35:
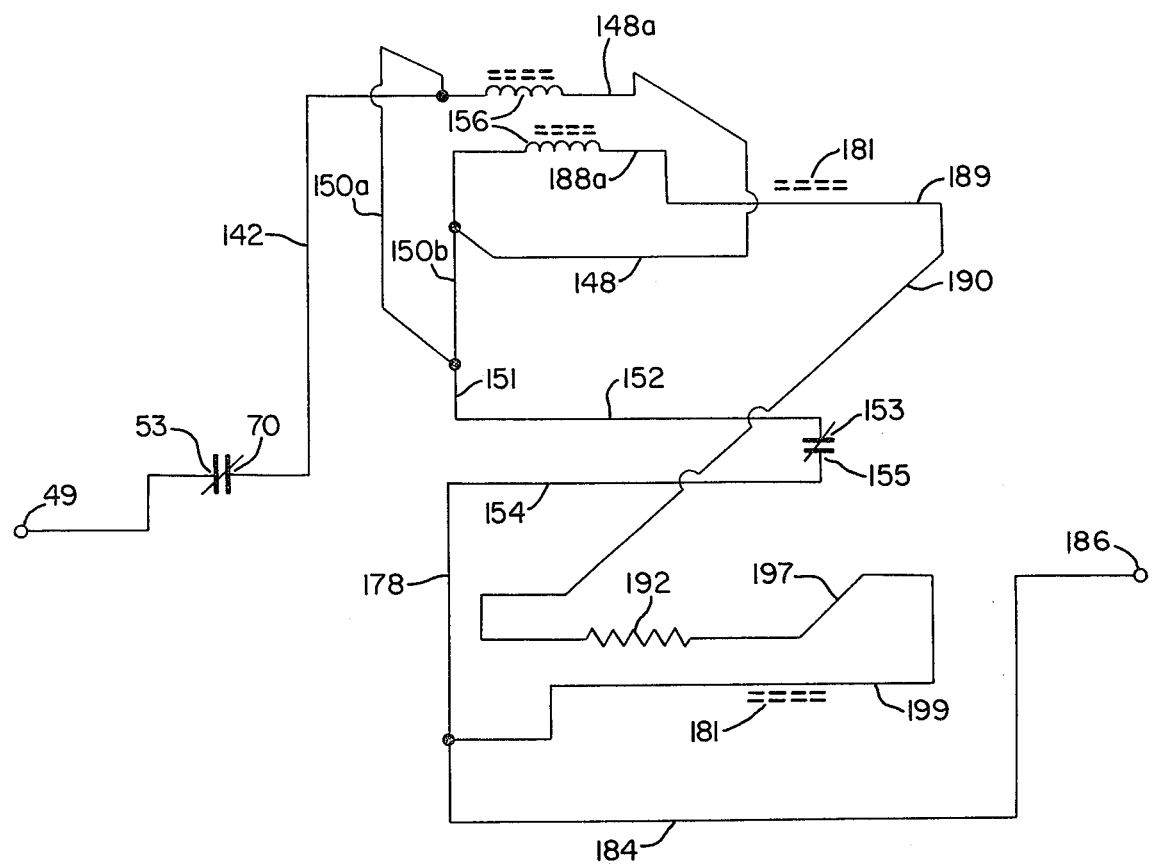
FIG. 35 is a schematic drawing illustrating the current path from line to load through the circuit breaker.

With reference to the drawings, a three-pole current limiting circuit breaker 40 constructed in accordance with the invention is shown in FIGS. 1, 2, and 34. The circuit breaker 40 includes a molded case comprising a molded base 41 and a complementary molded cover 42 each having a pair of outer side walls and a pair of spaced intermediate walls to provide three compartments 44, 45, and 46 (FIG. 2). The structure of a center pole of the circuit breaker 40 disposed in the center compartment 45 is shown in FIG. 1.

A line terminal and stationary contact assembly 48 is shown adjacent the left end of FIG. 1. The assembly 48 is better shown in FIGS. 3–6 and includes a terminal member 49 and a stationary contact mounting member 50 pivotally connected by a pin 51 and electrically interconnected by a braided wire cable 52. The terminal member 49 has a bight portion 49a and a pair of spaced leg portions 49b and 49c as a first U-shaped portion, the leg portions 49b and 49c merging respectively with a pair of spaced extending leg portions 49d and 49e of a second U-shaped portion having a split bight portion formed by two tabs 49f and 49g extending respectively from the leg portions 49d and 49e. A mounting tab 49h having an aperture 49i extending therethrough projects at right angles from the bight portion 49a oppositely from the leg portions 49b and 49c.

The member 50 has a bight portion 50a and a pair of spaced leg portions 50b and 50c as a first U-shaped portion, the leg portions 50b and 50c respectively having laterally extending ears 50d and 50e, a leg portion 50f of a second U-shaped portion extending from the bight portion 50a to a bight portion 50g, and a leg portion 50h opposite the leg portion 50f. The leg portions 49d and 49e and the ears 50d and 50e are apertured to receive the pin 51. The cable 52 has one end welded to the tab 49f, one end welded to the tab 49g, and a central portion welded to the bight portion 50a. A stationary main contact 53 and an arcing contact 54 are secured to the leg portion 50h in abutting relationship to each other. The leg portion 50f is provided with a threaded aperture 50i for receiving a retaining screw 56 (FIG. 1) for a contact pressure spring 57.

An internally threaded sleeve 58 is staked to the mounting tab 49h at the aperture 49i and disposed in an apertured mounting pad portion 41a of the base 41. A screw 59 threaded into the sleeve 48 secures an apertured connector body 60 to the tab 49h. The connector body 60 has suitable wire or cable receiving holes and is provided with an internally threaded hole for receiving a clamping screw 61.

Similar terminal and stationary contact assemblies 48 are provided in the outer poles of the compartments 44 and 46.

Figure 9:
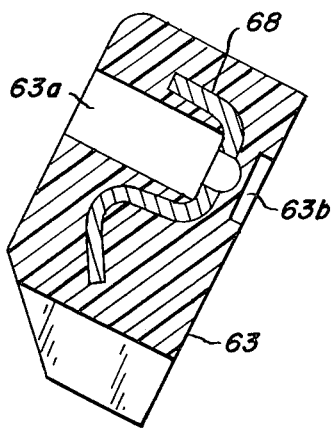
FIG. 9 is an enlarged cross sectional view through a blade cross bar of the current limiting circuit breaker of FIG. 1, taken between two blades.
Figure 10:
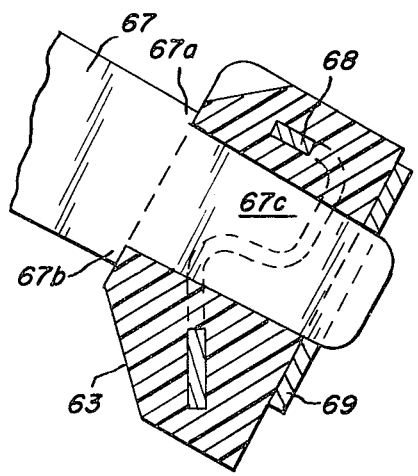
FIG. 10 is an enlarged cross sectional view similar to FIG. 9, but taken at a blade of the center pole.

A blade crossbar 63 extends transversely through the center compartment 45 into the outer compartments 44 and 46. The intermediate walls of the base 41 are slotted to receive the crossbar 63, but a bracket 64 (FIGS. 2 and 34) secured to the base 41 in the compartment 44 and an oppositely formed bracket 55 (FIG. 2) secured to the base 41 in the compartment 46 are provided to support the crossbar 64 for pivotal movement. Three movable contact blades 67, one in each pole, are mounted directly in the crossbar 63, which is made of molded plastic material and provided with a metallic reinforcing insert 68 (FIGS. 9 and 10). Tooling recesses such as recess 63a and recess 63b (FIG. 9) are provided at appropriate places in the crossbar 63 to hold it while the blades 67 are being assembled therein. Each blade 67 is provided with a pair of shouldered portions 67a and 67b (FIG. 10) which abut the crossbar 63 and from which a tapered mounting tongue portion 67c extends through the crossbar 63 and through a retaining plate 69 staked thereto. A movable contact 70 is provided on each blade 67 for engagement principally with an associated one of the main stationary contacts 53.

Figure 7:
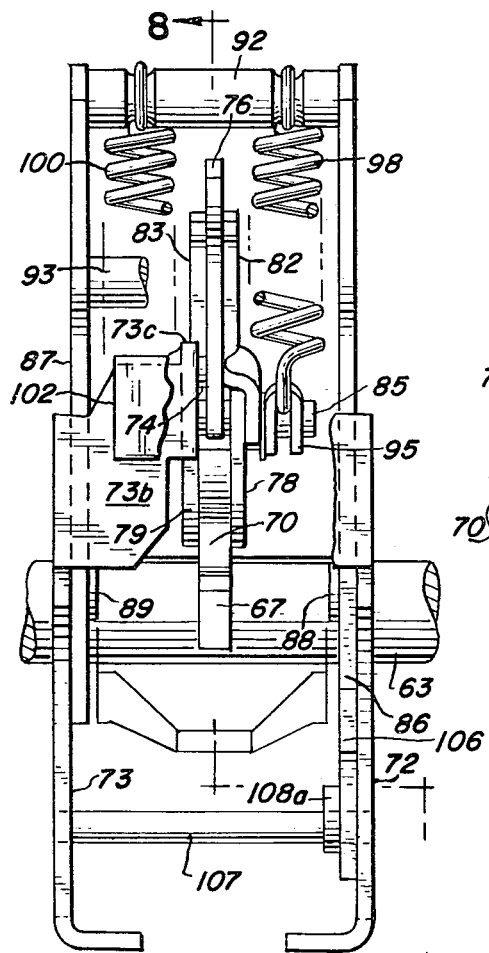
FIG. 7 is an enlarged end view of an operating mechanism in the center pole of the current limiting circuit breaker of FIG. 1, with portions broken away and the parts being shown in TRIPPED position.
Figure 8:
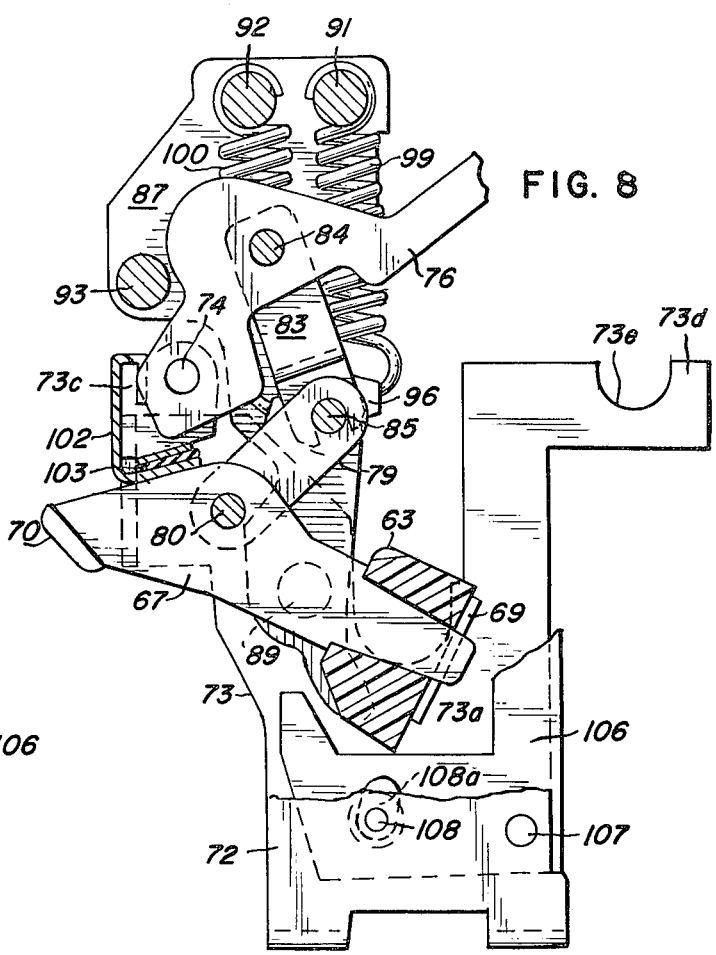
FIG. 8 is a side view of the operating mechanism of FIG. 7, with portions broken away.

Operating mechanism for the crossbar 63 and blades 67 is disposed in the center compartment 45 (FIG. 1). Portions of the operating mechanism are best shown in FIGS. 7 and 8, and are there shown in a TRIPPED position. Two oppositely formed frame members 72 and 73 (FIGS. 2, 7 and 8) are secured to the base 41 and contoured as at 73a (FIG. 8) which together with brackets 64 and 66 support the crossbar 63 for pivotal movement. The frame member 73 is provided with an arm portion 73b (FIG. 7) extending toward the frame member 72 and having a bent mounting ear 73c at its free end. A pin 74 is mounted adjacent one end in the ear 73c and adjacent the other end in a corresponding mounting ear (not shown) of the frame member 72. A releasably latchable cradle member or trip lever 76 is pivotally mounted adjacent one end on the pin 74. Two inner toggle links 78 and 79 are pivotally mounted adjacent their inner ends respectively on opposite end portions of a pin 80 mounted in the blade 67 of the center pole. Two outer toggle links 82 and 83 are pivotally mounted adjacent their outer ends respectively on opposite end portions of a pin 84 mounted in the trip lever 76. The outer end portions of the links 78 and 79 and the inner end portions of the links 82 and 83 are pivotally interconnected by an elongated toggle pin 85, the inner end portions of the links 82 and 83 being offset to straddle the outer end portions of the links 78 and 79.

A handle extension is formed by two handle plate members 86 and 87 pivotally mounted respectively on a pair of pins 88 and 89 disposed respectively in the frame members 72 and 73. The handle plate members are joined by a pair of spring anchoring pins 91 and 92 and a reset pin 93. The toggle pin 95 has a pair of spring hook members 95 and 96 pivotally mounted thereon respectively adjacent opposite ends thereof. A tension spring 97 (FIG. 2) is secured at an outer end to the pin 91 and at an inner end (not shown) to the member 95 on one side of the toggle pin 85, and a tension spring 98 (FIG. 7) is secured at an outer end to the pin 92 and at an inner end to the member 95 on the other side of the toggle pin 85. Similarly, a tension spring 99 (FIGS. 2 and 8) is secured at an outer end to the pin 91 and at an inner end to the member 96 on one side of the toggle pin 85, and a tension spring 100 (FIGS. 7 and 8) is secured at an outer end to the pin 92 and at an inner end (not shown) to the member 96 on the other side of the toggle pin 85. The springs 97, 98, 99 and 100 maintain the toggle pin 85 in open-slotted inner ends of the outer toggle links 82 and 83.

A retaining clip 102 is secured to the arm portion 73b of the frame member 73 and to the corresponding arm portion (not shown) of the frame member 72 for holding shock absorbing material 103 (FIG. 8) for the blade 67 of the center pole at the end of the opening movement.

Figure 11:
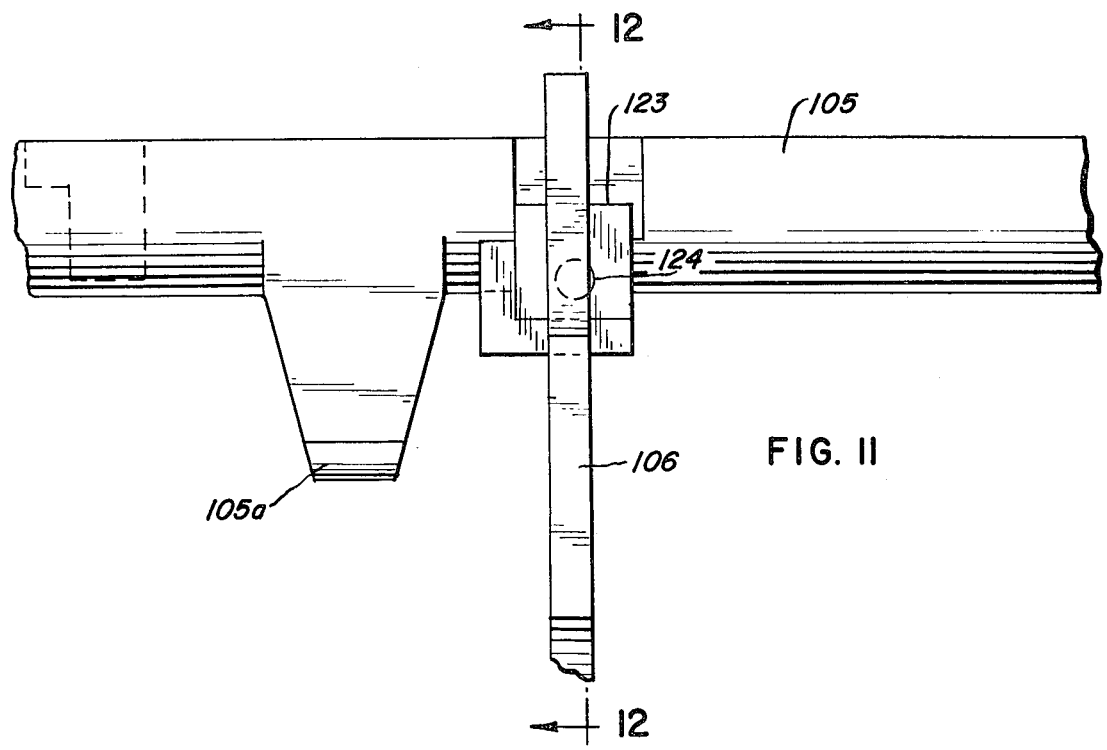
FIG. 11 is an enlarged fragmentary longitudinal view of a thermally actuated common trip bar and a fragmentary edge view of an associated thermal trip lever of the current limiting circuit breaker of FIG. 1.
Figure 12:
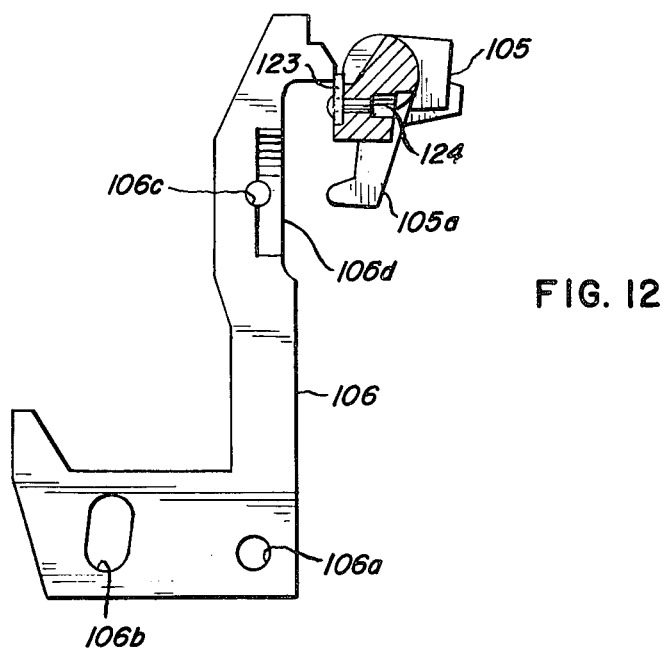
FIG. 12 is an actual size cross sectional view of the thermally actuated common trip bar taken substantially along the line 12—12 of FIG. 11 and a side view of the associated thermal trip level.

The frame member 73 includes an arm portion 73d (FIG. 8) having a semicircular recess 73e therein. The frame member 72 is similarly formed. A thermally actuated common trip bar 105 (FIGS. 1, 2, 11, 12, and 34) is pivotally mounted in the frame member 73 at the recess 73e and in the frame member 72 at a similar recess in an arm position 72d (FIG. 2) of the frame member 72. A generally L-shaped thermal trip lever 106 best shown in FIG. 12 is provided with an aperture 106a by which it is pivotally mounted on a pin 107 (FIGS. 1, 2, 7 and 8) having opposite end portions disposed respectively in the frame members 72 and 73. A pin 108 (FIG. 8) having an enlarged head portion 108a (FIG. 7) is received in an aperture 106b (FIG. 12) of the thermal trip lever 106 and mounted in the frame member 72 to limit pivotal movement of the trip lever 106 and prevent movement thereof axially along the pin 107.

A molded plastic operating handle 110 (FIGS. 1 and 2) extends through an aperture in the cover 42 and is recessed in an enlarged inner end portion to receive the pins 91 and 92 and the outer end portions of the handle plate members 86 and 87.

Each of the outer two poles is provided with a pin 107 (FIGS. 2 and 34) identical to the pin 107 of the center pole but having one end portion mounted in an appropriate groove in an outer wall portion of the base 41 and an opposite end portion mounted in a respective one of the brackets 64 and 66. Each of the three pins 107 has a magnetic core holder 111 and an armature plate 112 pivotally mounted thereon. Each holder 111 carries a generally U-shaped magnetic core 113 having opposite leg portions secured respectively to spaced opposite side portions of the holder. As viewed in FIGS. 1 and 34, each side portion (only one being visible) of the holder 111 is generally in the shape of an inverted "Y" having one leg pivotally mounted on the pin 107 and the other leg connected to a corresponding leg of the other side portion by a rear plate portion having an air gap adjusting screw 115 threaded therein. Each screw 115 extends through a rear wall portion of the base 41 and has a compression spring 116 mounted thereon. Turning of a screw 115 adjusts the air gap between the free ends of the leg portions of the respective magnetic core 113 and armature plate 112.

Each of the armature plates 112 is provided with a pair of opposite bent-over ears 112a, each ear 112a being spaced inwardly of a side portion of the respective magnetic core holder 111 and having an opening aligned with that of the opposite ear for receiving the respective pin 107. As shown in FIG. 2, a right-hand side portion of each holder 111 is outwardly offset at the portion mounted on the respective pin 107, and a right-hand ear of each of the armature plates 112 is similarly offset so as to be hidden by the holder 111. Thus, only the left-hand ear 112a of each armature plate 112 is visible in FIG. 2. A free end portion of each armature plate 112 is secured by a pair of rivets 117 (FIG. 2) to a common trip bar 118 of molded plastic extending through the center compartment 45 into the outer compartments 44 and 46. The armature plate 112 of the center pole is apertured to receive a free end portion of the trip lever 76 and thereby releasably latch the trip lever, as shown in FIG. 1. The three armature plates 112 and the common trip bar 118 are biased toward latching position for the trip lever 76 by a pair of tension springs 120 (FIGS. 2 and 34) disposed respectively in the two outer compartments 44 and 46 and each secured at one end to a respective armature plate 112 and at the other end to a respective one of the brackets 64 and 66.

Each of the compartments 44, 45, and 46 has a barrier plate 122 (FIGS. 1 and 34) mounted in appropriate grooves in the walls of the base 41 and extending into the cover 42 adjacent the common trip bar 105 on the opposite side thereof from the respective armature plate 112. As best shown in FIGS. 11 and 12, a latch plate 123 is secured to the common trip bar 105 by a rivet 124. The thermal trip lever 106 is provided with a hole 106c and a lanced portion 106d, the hole being partly in the lanced portion. A tension spring 125 (FIGS. 1 and 2) is anchored at one end on the lanced portion 106d at the hole 106c and at the other end on the barrier plate 122 in the center compartment 45 to bias the thermal trip lever 106 clockwise about the pin 107, the barrier plates 122 being omitted in FIG. 2. Each barrier plate 122 is provided with a hook portion 122a (FIGS. 1 and 34), and in each of the two outer compartments 44 and 46 a compression spring 126 (FIG. 34) is seated at one end on the respective hook portion 122a and at the other end on an appropriate portion of the common trip bar 105 to bias the trip bar 105 and the latch plate 123 mounted thereon toward latching position with respect to the thermal trip lever 106.

A push-to-trip button 128 (FIG. 34), more completely shown and described in copending application, Ser. No. 471,399, filed May 20, 1974, and assigned to the assignee of this application, has a compression spring 129 mounted thereon to normally maintain the button flush with the surface of the cover 42 and is engageable with the common trip bar 118 upon being pushed inwardly to move the armature plate 112 of the center compartment 45 clockwise in FIG. 1 toward unlatching position with respect to the trip lever 76.

Figure 33:
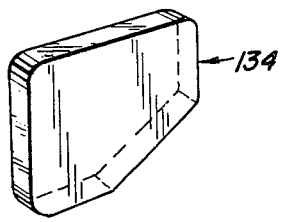
FIG. 33 is a perspective view of one of the arc plates in the arc chute of FIGS. 30–32.

Each of the compartments 44, 45, and 46 is provided with a laminated field magnet assembly comprising a plurality of generally O-shaped plates 130 and a plurality of generally U-shaped plates 131 disposed around the respective stationary contacts 53–54 and movable contacts 70 of each pole. The field magnet assemblies are coated with an arc extinguishing material such as one of those disclosed in copending application, Ser. No. 364,596, filed May 29, 1973, and assigned to the assignee of this application. Further, each compartment is provided with an arc chute 133 including a plurality of metal arc plates 134 best shown in FIG. 33 and a pair of venting plates 135 and 136 formed of insulating material.

The arc extinguishing material referred to above is used to coat other elements of this invention hereinafter described. Its function is to help create a medium in the arc chamber which brings about a rapid rate of dielectric strength recovery of the gap. A suitable material by way of example is a filler of between 40% to 56% by weight of hydrated zinc borate in a dimethyl silicone resin. A more complete description of such arc extinguishing material, and additional examples, are set forth in copending application referred to above and hereinafter by its Ser. No. 364,596.

In each compartment, the movable contact blade 67 is connected by a flexible braided cable 138 (FIGS. 1 and 34) to one leg of a generally U-shaped conductor 139 secured at a bight portion to the base 41 by a pair of screws 140 and 141. The other leg of conductor 139 is secured to a conductor 142 secured to the base 41 by a screw 143 and extending between the leg portions of the U-shaped magnetic core 113 and along the barrier plate 122. A generally L-shaped bimetallic strip 145 is secured at one end to the bight portion of the U-shaped conductor 139. The common trip bar 105 is provided with three actuating legs 105a, one in each of the compartments 44, 45, and 46, only the center actuating leg 105a disposed in the compartment 45 being shown in FIGS. 11 and 12. The free end portion of the bimetallic strip 145 in each compartment is engageable with the respective actuating leg 105a, and upon sustained moderate overload current flow in the conductor 139, the bimetallic strip 145 is heated sufficiently to pivot the actuating leg 105a counterclockwise as viewed in FIGS. 1 and 34, the high expansion side of the bimetallic strip being on the inside of the L-shape. The thermal trip lever 106 in the center compartment 45 is thereby released from the latch plate 123 on the thermally actuated common trip bar 105 and strikes the common trip bar 118 under the influence of the tension spring 125 to pivot the armature plates 112 about their respective pins 107 clockwise as viewed in FIGS. 1 and 34. The trip lever 76 in the center compartment 45 is thereby released to effect opening movement of the three movable contact blades 67. If a fault current higher than the moderate overload current flows through any of the conductors 142, the respective magnet 113 attracts its associated armature plate 112 and all three of the armature plates 112 are pivoted clockwise to release the trip lever 76 and open the contact blades 67. Pushing the button 128 also pivots the common trip bar 118 and the 3 armature plates 112 clockwise to release the trip lever 76 and open the contact blades 67.

The end of each conductor 142 opposite the end secured by the screw 143 is connected by a screw 146 (FIGS. 1, 2, and 34) to a flatwise L-shaped strap portion 148a of a box-like conductor 148 best shown in FIGS. 13–16. The conductor 148 includes the strap portion 148a, an end portion 148b, a pair of spaced side portions 148c and 148d, and a split end portion including a tap portion 148e extending from the side portion 148c and a tab portion 148f extending from the side portion 148d. The side portions are generally square, except that the side portion 148c includes a mounting tab 148g extending toward the base 41 when assembled.

In each of the compartments 44, 45, and 46, a conductor 150 includes an edgewise L-shaped portion 150a secured at an end of a longer leg thereof to a tab extending from a shorter leg of the strap portion 148a and joined at an end of a shorter leg thereof to an end of a strap portion 150b having an opposite end secured to the tab portions 148e and 148f. A flexible braided cable 151 is secured at one end to the conductor 150 and at the other end to auxiliary contact means for current limiting, including a movable contact blade 152 (FIGS. 1 and 34) having a contact 153 mounted thereon. The blade 152 cooperates with another movable contact blade 154 having a contact 155 mounted thereon.

Figure 17:
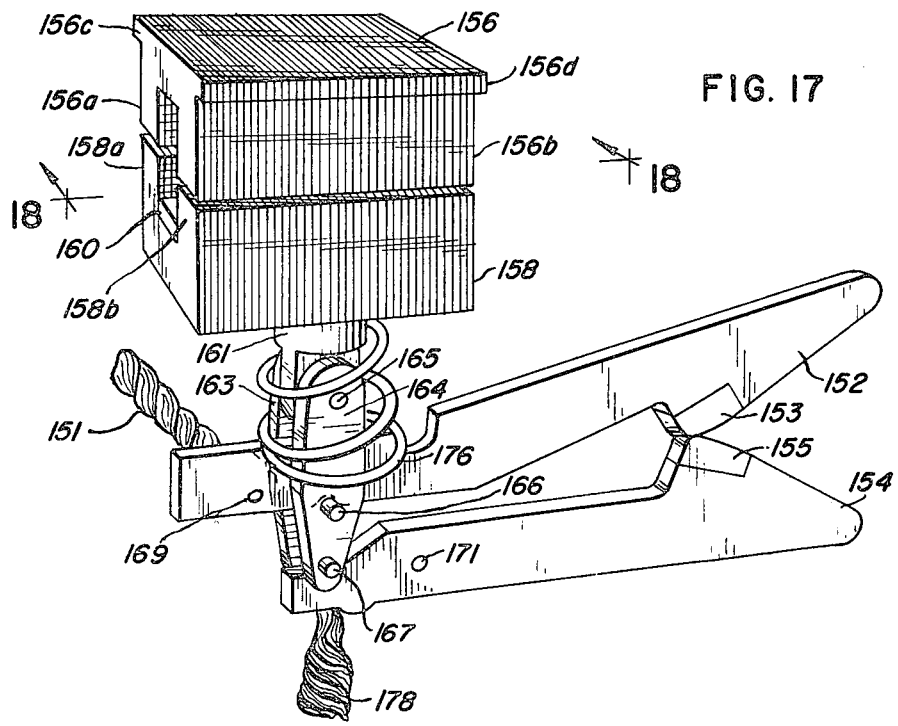
FIGS. 17, 18, and 19 are perspective, side, and end views, respectively, of an electromagnet and contact blade assembly of any one of the poles of the current limiting circuit breaker of FIG. 1, the electromagnet being associated with the conductor assembly of FIGS. 14–16 and having portions broken away in FIGS. 18 and 19.
Figure 18:
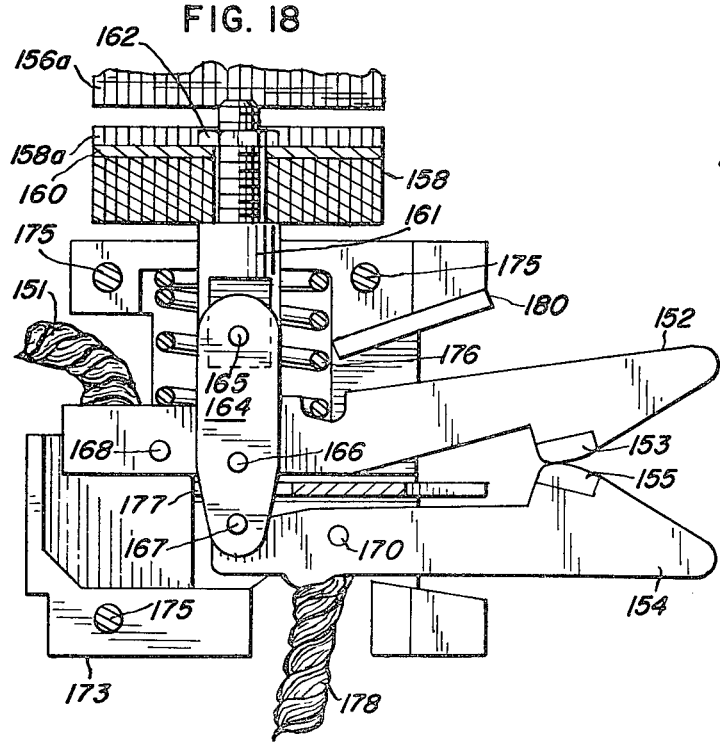
Figure 19:
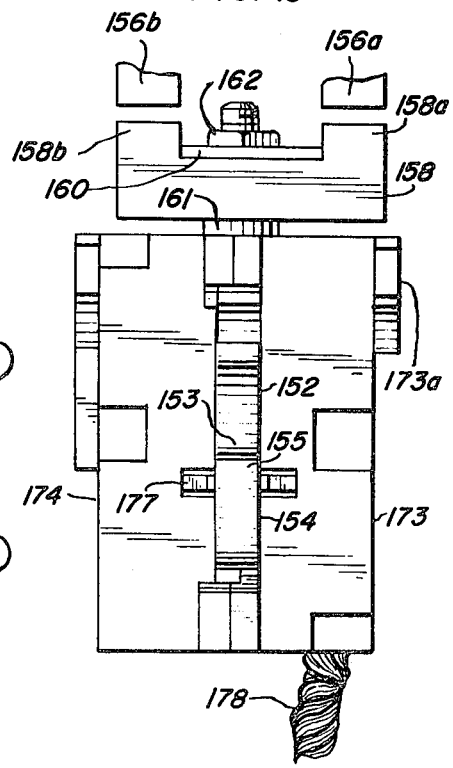

In each of the compartments 44, 45, and 46, the mechanism by which the blades 152 and 154 are operated is best shown in FIGS. 17–19. A generally U-shaped laminated magnetic core 156 is disposed in an outer portion of the box-like conductor 148 (FIGS. 1 and 34) with a pair of spaced leg portions 156a and 156b thereof (FIG. 17) stradling the strap portion 148a and a pair of oppositely extending shoulder portions 156c and 156d thereof (FIG. 17) respectively engaging the side portions 148c and 148d (FIG. 13). A generally U-shaped laminated armature 158 (FIGS. 17–19) is disposed in an inner portion of the box-like conductor 148 (FIGS. 1 and 34) with a pair of spaced relatively short leg portions 158a and 158b thereof (FIGS. 17 and 19) disposed respectively opposite and in spaced relationship to the leg portions 156a and 156b. An armature pin support plate 160 is disposed between the leg portions 158a and 158b. The armature 158 is provided with a hole disposed centrally of a bight portion thereof and aligned with a hole in the support plate 160 for receiving an outer threaded stud portion of an armature pin 161 having a nut 162 threaded thereon to secure an inner, enlarged shouldered portion of the pin 161 against an inner side of the armature 158. The armature pin 160 is provided with a pair of opposed flats at its inner end and two spaced links 163 and 164 are pivotally mounted thereon by a pin 165. The links 163 and 164 carry a pin 166 engaged in a notch in an edge of the blade 152 facing the blade 154 and a pin 167 normally engaged with an edge of the blade 154 facing the blade 152. The blade 152 is pivotally mounted on a pin 168 received in a hole 169 (FIG. 17) and the blade 154 is pivotally mounted on a pin 170 received in a hole 171. The pivot pins 168 and 170 are disposed on opposite sides of the armature pin 161 and opposite end portions thereof are received respectively in a pair of molded inner casing portions 173 and 174 (FIG. 19) secured together by a plurality of rivets 175. A compression spring 176 disposed in the casing portions 173 and 174 encircles the armature pin 161 and bears on the blade 152 to urge it clockwise in FIG. 18 toward closed position. The blade 152 bears on the pin 166 and causes the pin 167 to bear on the blade 154 to urge it counter-clockwise in FIG. 18 toward closed position. The spring 176 is also a return spring for the armature 158 and armature pin 161. A shield 177 (FIGS. 18 and 19) having a forked end portion straddling the links 163 and 164 is disposed between the blades 152 and 154 and mainly within the casing portions 173 and 174. Appropriate openings are provided in the casing formed by the casing portions 173 and 174 for the armature pin 161, the cable 151, the contact blades 152 and 154, and a flexible braided cable 178 secured to the blade 154. The sides 148c and 148d of the box-like conductor 148 respectively engage the casing portions 173 and 174, and the mounting tab 148g (FIGS. 15 and 16) is disposed between a pair of bosses on the casing portion 173, one such boss 173a being shown in FIG. 19. The contact end portions of the blades 152 and 154 are disposed outwardly of the casing 173–174 and a piece of shock absorbing material 180 (FIG. 18) is mounted in the casing adjacent the blade 152 to cushion opening movement thereof.

Figure 23:
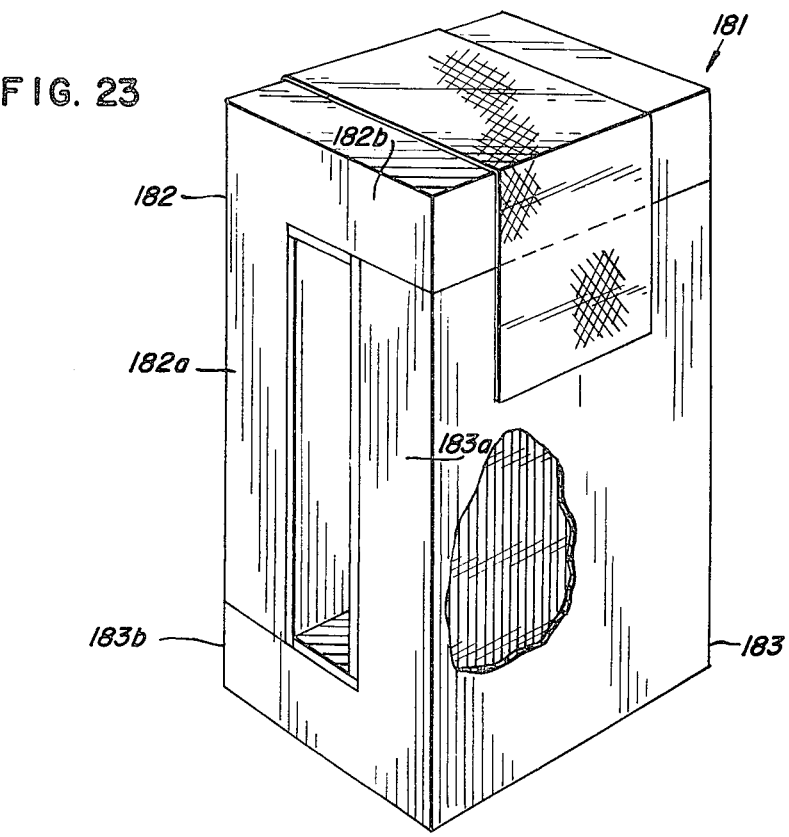
FIGS. 23, 24, and 25 are perspective, end, and side views, respectively, of a field magnet assembly of any one of the poles of the current limiting circuit breaker of FIG. 1.
Figure 24:
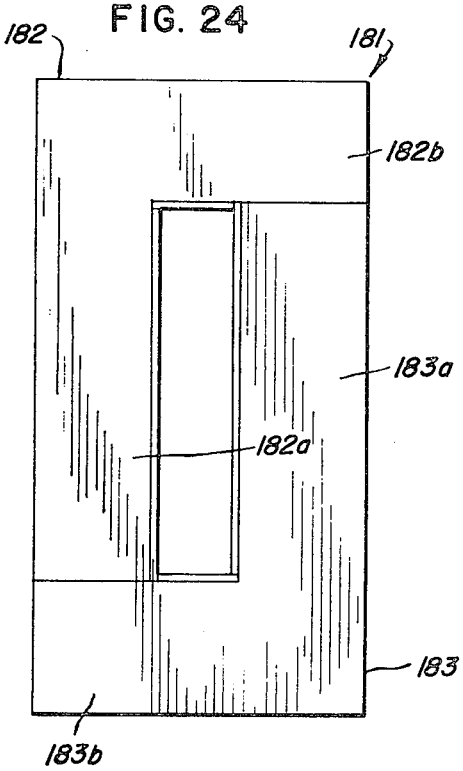
Figure 25:
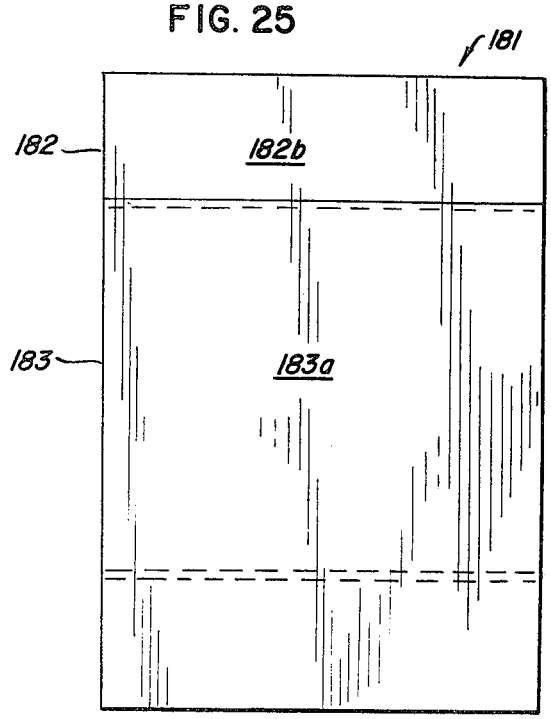
Figure 26:
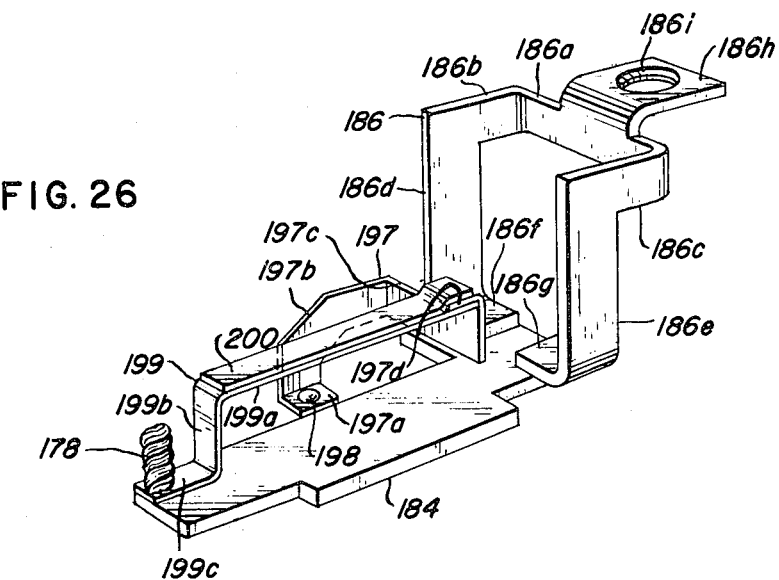
FIGS. 26, 27, 28, and 29 are perspective, top, inner end, and side views, respectively, of an electrical conductor and load terminal assembly of any one of the poles of the current limiting circuit breaker of FIG. 1.
Figure 27:
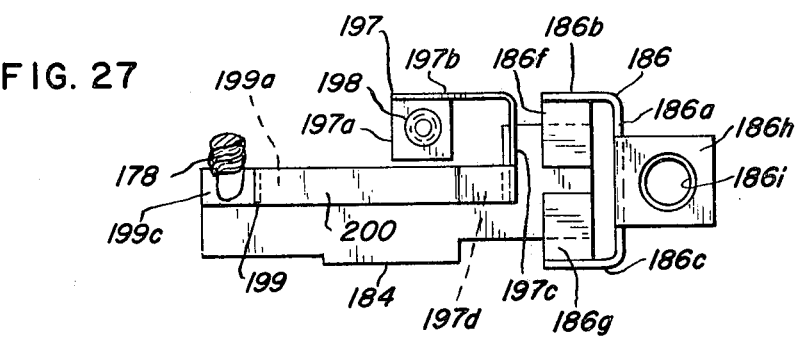
Figure 28:
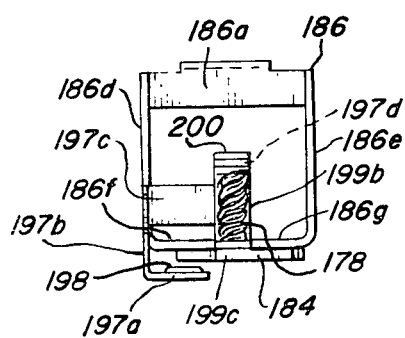
Figure 29:
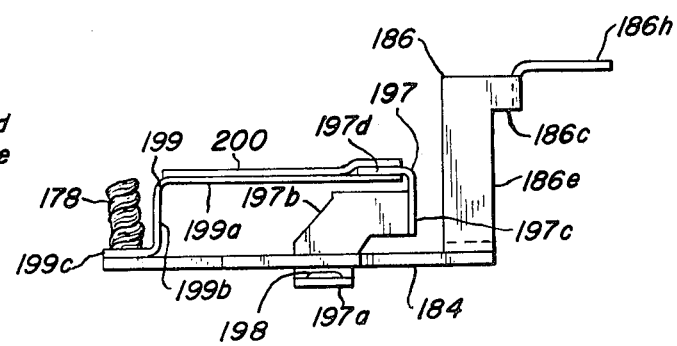

A magnetic core structure 181 generally in the form of a rectangular tube surrounds the contact end portions of the blades 152 and 154 extending outwardly of the casing 173–174. The magnetic core structure 181 is best shown in FIGS. 23–25 and comprises two identical, generally L-shaped, laminated magnetic cores 182 and 183 arranged as shown with an end of a long leg portion 182a of the core 182 abutting an inner side of a short leg portion 183b of the core 183 and an end of a long leg portion 183a of the core 183 abutting an inner side of a short leg portion 182a of the core 182. Each of the cores 182 and 183 is coated with an arc extinguishing material such as disclosed in the aforesaid copending application, Ser. No. 364,596, and additional pieces of such material are adhesively secured respectively to inner sides of the L-shaped assemblies as shown in FIGS. 23 and 24. Alternatively, the cores 182 and 183 could be generally U-shaped, C-shaped or J-shaped.

In each of the compartments 44, 45, and 46, the cable 178 connected to the blade 154 is electrically connected at an opposite end to one end of a terminal strap 184 best shown in FIGS. 26–29 and having a terminal member 186 secured to an opposite end. The terminal member 186 is similar to the terminal member 49 and has a bight portion 186a and a pair of spaced leg portions 186b and 186c as a first U-shaped portion, the leg portions 186b and 186c merging at right angles respectively with a pair of spaced leg portions 186d and 186e of a second U-shaped portion having a split bight portion formed by two tabs 186f and 186g extending respectively from the leg portions 186d and 186e. The tabs 186f and 186g are secured to the terminal strap 184. A mounting tab 186h having an aperture 186i extending therethrough projects at right angles from the bight portion 186a oppositely from the leg portions 186b and 186c.

An internally threaded sleeve 58 (FIGS. 1 and 34) identical to those staked to the tabs 49h is staked to the mounting tab 186h of each of the terminal members 186 at the aperture 186i therein and disposed in an apertured mounting pad portion 41b of the base 41. A screw 59 threaded into the sleeve 58 secures an apertured connector body 60 to the tab 186h. The connector body 60 is identical to those secured to the tabs 49h and is provided with an internally threaded hole for receiving a clamping screw 61.

In each of the compartments 44, 45, and 46, a conductor 188 (FIGS. 13–16) has a tab 188a secured to the end of the strap portion 150b adjacent the tabs 148e and 148f, a strap portion 188b (FIGS. 1 and 34) extending between the leg portions 156a and 156b of the magnetic core 156, an offsetting portion 188c extending generally parallel to the tab 188a, and a strap portion 188d extending through the magnetic core assembly 181 formed by the two L-shaped magnetic cores 182 and 183 along the inner side of the short leg portion 182b. A strip 189 of arc extinguishing material such as disclosed in the aforementioned copending application, Ser. No. 364,596, is adhesively secured to the side of the strap portion 188d facing the contact blade 152. A conductor 190 includes a tab portion 190a secured to an end of the strap portion 188d and extending and bent from a strap portion 190b. The strap portion 190b extends parallel to an end face of the magnetic core 182 and is joined at right angles to a strap portion 190c extending somewhat diagonally across the outer side of the long leg portion 182a. The strap portion 190c is joined at right angles to a strap portion 190d extending along a rear wall of the base 41 and having an apertured offset connecting tab portion 190e disposed in a hole extending through the rear wall of the base 41. An internally threaded fastener 191 is secured to the connecting tab portion 190e.

Opposite the compartments 44, 45, and 46, the rear wall of the base 41 is provided on the rear side with three shallow recesses 44a, 45a, and 46a (FIG. 2) each having a resistor 192 potted therein with potting material 193, preferably a ceramic compound having properties of good thermal conductivity, such as alumina or silica based ceramics. A thin plastic cover 194 is recessed in the base 41 and adhesively secured in place to cover the potting material in all three of the recesses 44a, 45a, and 46a. The resistor 192 in each recess is made of material having a positive temperature coefficient of resistance, is preferably chromium-plated substantially pure iron wire, and is best shown in FIGS. 20–22. An important feature of the resistor 192 is that its resistance is transformable from a relatively low value to a relatively much higher value. Other materials which have a positive temperature coefficient of resistance and can be used for the resistor 192 in place of substantially pure iron include tungsten, nickel, cobalt, and alloys or metallic compounds of these and other elements such as cobalt-iron and zirconium diboride. In these materials, the resistance is a direct function of temperature.

As shown in FIG. 20, the resistor 192 terminates at each end in a flattened, generally P-shaped portion which includes a straight portion of length "X" to which an electrode is attached for electroplating in a solution containing chromium. After electroplating, the electrode terminal portions, as shown in broken lines for one of the end portions in FIG. 21, are cut off, and the remainder of the flattened end is aligned with the plane containing the axis of the circular wire, as shown in FIG. 22.

In each of the recesses 44a, 45a, and 46a, a screw 195 (FIGS. 1 and 34) secures an end portion 192a of the respective resistor 192 (FIG. 20), modified as described above, to the tab portion 192e (FIG. 13) of the conductor 190. A screw 196 secures an opposite end portion 192b, modified as described, to an apertured connecting tab portion 197a of a conductor 197 (FIGS. 26–29). An internally threaded fastener 198 is secured to the connecting tab portion 197a. The conductor 197 includes a strap portion 197b extending at right angles to the connecting tab portion 197a along an end of the short leg portion 183b of the magnetic core 183 and joined at right angles to a strap portion 197c extending along an end face of the core 183. A bent tab 197d extending from the strap portion 197c is secured to a conductor 199 having a strap portion 199a extending through the magnetic core structure 181 along the inner side of the short leg portion 183b of the magnetic core 183. An offsetting portion 199b joins the strap portion 199a to a tab portion 199c secured to the terminal strap 184 and having the cable 178 secured thereto. A strip 200 of arc extinguishing material such as disclosed in the aforesaid copending application, Ser. No. 364,596, is adhesively secured to the side of the strap portion 199a facing the contact blade 154.

Figure 30:
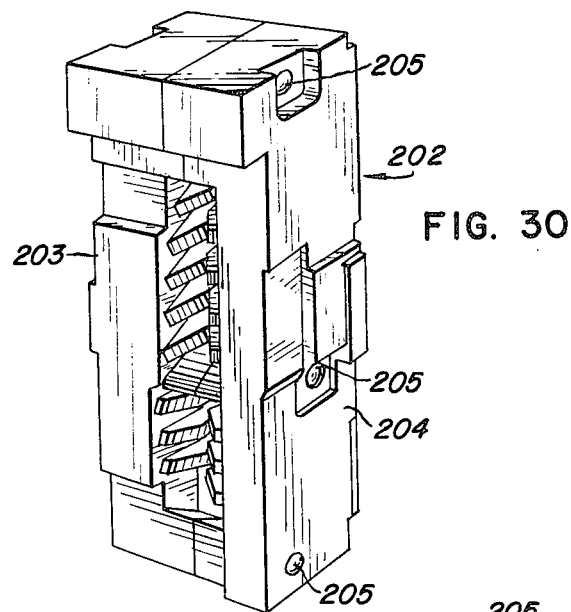
FIGS. 30 and 31 are perspective and front views, respectively, of an arc chute adjacent the load terminal assembly of any one of the poles of the current limiting circuit breaker of FIG. 1.
Figure 31:
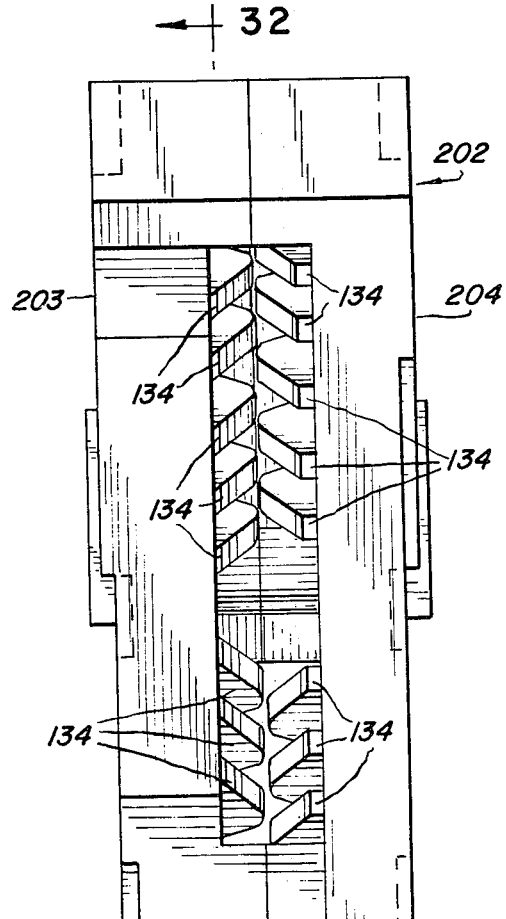
Figure 32:
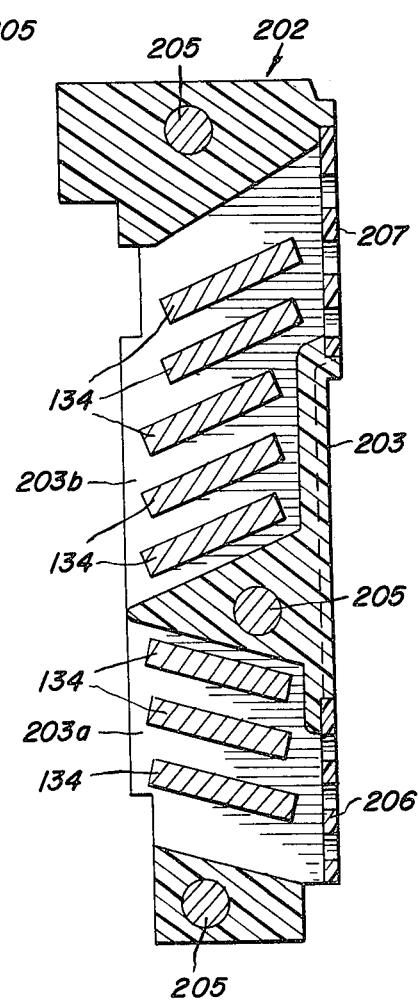
FIG. 32 is a sectional view taken generally along the line 32—32 of FIG. 31.

In each of the compartments 44, 45, and 46, an arc chute 202 (FIGS. 1 and 34) for the contacts 153 and 155 is disposed adjacent the magnetic core structure 181. The arc chute 202 is best shown in FIGS. 30–32 and includes a pair of molded casing portions 203 and 204 secured together by a plurality of rivets 205. Each of the casing portions 203 and 204 is provided with a pair of recesses on a side thereof facing the other casing portion, such as an inner recess 203a and an outer recess 203b (FIG. 32) in the casing portion 203, to provide a pair of passageways through the arc chute 202. Each of the casing portions is grooved on a wall of each recess facing the other casing portion and each groove has one of the arching plates 134, best shown in FIG. 33, adhesively secured therein. A venting plate 206 is adhesively secured to the casing portions 203 and 204 and is disposed in the base 41 rearwardly of the respective connector body 60. A venting plate 207 is adhesively secured to the casing portions 203 and 204 and is disposed in the cover 42 of the assembled circuit breaker 40 forwardly of the Respective connector body 60. From the contact side of the arc chute, the arc plates 134 in the inner recess 203a slant toward the rear wall of the base 41, and those in the outer recess 203b slant toward the front wall of the cover 42. The arc plates 134 in the casing portion 204 slant in a similar fashion, but as best shown in FIG. 31, they are staggered with respect to those in the casing portion 203.

In each of the compartments 44, 45, and 46, when the contacts 153 and 155 are closed, part of the current from the conductor 142 flows through the L-shaped portion 150a of the conductor 150 to the cable 151 and the remainder flows by way of the strap portion 148a through the box-like conductor 148 and the strap portion 150b of the conductor 150 to the cable 151. From the cable 151 the total or recombined current flows through the contact blade 152, contacts 153 and 155, contact blade 154, cable 178, and the terminal strap 184 to the terminal member 186.

The strap portion 148a and the magnetic core 156 in each compartment form an electromagnet. Upon flow of a fault current through the strap portion 148a greater than that at which the magnetic core 113 attracts the armature plate 112, the magnetic core 156 attracts the armature 158 along with the plate 160, armature pin 161, nut 162, links 163 and 164, and pins 165, 166, and 167. The pin 166 pivots the blade 152 about the pin 168 toward an open position, and the pin 170 releases the blade 154 so that it is free to pivot about the pin 170 toward an open position under the influence of a repulsion force between the two blades due to the current path through the blades. The blades 152 and 154 are also moved apart by magnetic forces induced by the current flow therethrough, it being noted that they constitute partial conductor turns for the magnetic core structure 181. The contacts 153 and 155 are thus separated to switch the current path through the resistor 192.

The parallel circuits between conductor 142 and cable 151, comprising a circuit through conductor 150a in parallel with the circuit through conductors 148a, 148, and 150b, provides by-pass means for sufficient current to prevent opening the current limiting contacts 153 and 155 until a threshold fault current above a selected magnitude is present for magnetic core 156 to attract armature 158 which opens contacts 153 and 155. By way of example, this circuit arrangement and electromagnet characteristics may be adapted to prevent separation of the limiting contacts 153 and 155 below a threshold of 1,000 amps.

When the contacts 153 and 155 are separated, part of the current from the conductor 142 flows through the L-shaped portion 150a and also through the strap portion 150b of the conductor 150 to the conductor 188, and the remainder flows by way of the strap portion 148a through the box-like conductor 148 to the conductor 188. The recombined current then flows through the conductors 188 and 190, through the resistor 192, through the conductors 197 and 199, and through the terminal strap 184 to the terminal member 186.

The current limiter contacts preferably do not operate in the thermal overload range but only at relatively higher ranges of fault current or short circuit conditions. Within the thermal overload range, one or more of the bi-metallic strips 145 are operable to trip the circuit breaker and open the sets of main contacts 53 and 54 as previously described. Immediately above the thermal overload range, fault currents are still relatively low but are of sufficient magnitude to cause attraction of one or more of the armature plates 112 and open the sets of main contacts 53 and 54 as previously described. Immediately above the thermal overload range, fault currents are still relatively low but are of sufficeint magnitude to cause attraction of one or more of the armature plates 112 and open the sets of main contacts 53 and 54 as previously described. Such fault currents are below the interrupting ability of the sets of main contacts 53 and 54. Fault currents immediately above this range are just sufficient to cause magnetic core 156 to attract armature 158 and pin 161 which cause limiter contacts 153 and 155 to open. As the current decays, the magnetic forces also decay. The compression spring 176 in urging contacts 153 and 155 to a closed position tends to dominate over the decaying current causing those contacts to reclose while a short arc still exists in a small air gap between them. This action often leads to contact welding. To solve this problem, an additional or supplemental magnetizing turn 188b is provided in series with current limiting resistor 192. Thus, while fault current still flows in resistor 192, magnetic core 156 will be sufficiently energized to attract armature 158 to hold contacts 153 and 155 apart.

In each compartment, the strap portion 148a is the only effective conductor turn for the manetic core 156 when the contacts 153 and 155 are closed, and only part of the current flows therethrough, the remainder flowing through the by-pass conductor provided by the L-shaped portion 150a. When the contacts 153 and 155 are open, the strap portion 188b provides an additional conductor turn, and it carries the total current while the strap portion 148a is effective as a conductor turn carrying part of the current. The additional conductor turn 188b enables the blades 152 and 154 to be maintained in an open position with less current than is required to move them to an open position originally. By the time the blades 152 and 154 move back to closed position under the influence of the spring 176, the fault current will have been dissipated in the resistor 192 and the blades 67 will have been opened.

In each of the compartments 44, 45, and 46, the strap portions 188d and 199a are conductor turns for the magnetic core structure 181. Further, portions of the contact blades 152 and 154 are partial conductor turns for the magnetic core structure 181. When the contact blades 152 and 154 are moved to open position and an arc 208 forms between the open contacts 153 and 155, the magnetic field set up as a result of current flow through the partial conductor turn portions of the contact blades 152 and 154 acts on the arc 208 to force it toward the arc chute 202 with its staggered, slanting arc plates 134. Once the arc is interrupted, the current flow shifts to the previously described path through the resistor 192, and the flow through the conductor turns 188d and 199a maintains the magnetic field, aids the dielectric strength recovery of the gap, and thereby guards against re-ignition. Any re-ignition of the arc would also take place in a magnetic field, which would force the arc out again.

The device of this invention is compact enough to fit into existing circuit breaker panelboards and yet it is capable of repeatedly interrupting currents in excess of 100,000 amperes root-mean-square (RMS) symmetrical. With such currents available, the arc which forms between the contacts 153 and 155 upon their opening must be extinguished in about a millisecond or less. This is accomplished by the generation of a sustained arc voltage which reaches the magnitude of the impressed supply voltage in about a millisecond or less. The structure used to accomplish this result includes the fast operating mechanism for opening the blades 152 and 154 with their contacts 153 and 155, the magnetic core structure 181, the coating of the arc chamber with arc extinguishing material, and the resistor 192 connected in parallel with the contacts 153 and 155.

The magnetic core structure 181 encloses the contacts 153 and 155 and a substantial portion of the blades 152 and 154 and provides a magnetic field with the maximum practical value of magnetic flux density normal to the blades 152 and 154 and also normal to the arc. The magnetic field exerts a force on each blade tending to "blow" them apart, and also exerts a force on the arc 208 tending to "blow" the arc out toward the arc chute 202. The force is proportional to the product of the current and the magnetic flux density. Since the magnetic flux density is derived from the current, the force is proportional to the square of the current, and the higher the available current is, the faster the blades open and the faster the arc is blown out. The response of the current limiting device is thus proportional to the severity of the short circuit. The magnetic core structure 181 and blades 152 and 154 are so arranged that the lines of force in the magnetic field intersect blades 152 and 153, through which current flows in opposite directions, from the direction which will force said blades apart. As viewed in FIG. 1, when current flows in the direction from cable 151, forward through contacts 153 and 155, then from the contact end of blade 154 back through blade 154 and out through cable 178, then during such current flow the magnetic flux and lines of force in the transverse magnetic field extend from leg 183a (FIG. 23) of magnetic core 183 to leg 182a (FIG. 23) of magnetic core 182 (FIGS. 1 and 23). This arrangement of current flow through blades 152 and 154, and magnetic flux across said blades tends to force blades 152 and 154 apart.

Furthermore, when blades 152 and 154 separate and an arc 208 forms bewteen contacts 153 and 155, current flows through said arc from contact 153 to contact 155. The transverse magnetic field, with lines of force from leg 183a to leg 182a, acting on such arc with current flow as described, will therefore "blow" the arc forward toward arc plates 134. This "blowing" action effectively increases the arc length and resistance and therefore arc voltage, consequently limiting the current as well as extinguishing the arc. The magnetic field also aids the rate of dielectric strength recovery of the gap across contacts 153 and 155 following arc extinction and the subsequent continued rise of the impressed voltage across the gap after current transfer. It should also be noted that by increasing arc voltage the transverse magnetic field has the effect of increasing the power factor of the circuit by inserting resistance into the essentially inductive short circuit thereby reducing the lag of current behind voltage. The power factor is increased almost to unity.

Blades 152 and 154 are elongated and pivotally mounted at respective points 151 and 170, which provides leverage effect to increase speed and resistance at the contact ends thereof when actuated by magnetic core 156. Thus, when core 156 is energized to raise armature pin 161 a given distance within a given time, the contact ends of blades 152 and 154 and respective contacts 153 and 155, will move apart a greater distance within a shorter time than the corresponding displacement and rate of speed of armature pin 161.

The contact blades 152 and 154, and contacts 153 and 155, are shaped and dimensioned to provide structures of relatively low mass and minimum inertia to respond quickly and open rapidly when the electromagnet is energized.

The contact blades 152 and 154 are constructed, dimensioned and mounted with respect to the actuating electromagnet (magnetic core 156, armature 158) to provide a gap on the order of one-quarter inch within one sixteenth cycle of current flow or about 0.001 seconds (within one millisecond).

The electromagnetic means (magnetic core 156, armature 158, pin 161, and connecting links), the field magnet structure 181, blades 152 and 154, and the particular way in which they are positioned and associated as described, serve to open the current limiting contacts 153 and 155 in about 0.0002 seconds (0.2 of a millisecond) from initiation of a fault current in the circuit above the threshold selected for operation of the current limiting section, or within one-eightieth cycle of current flow.

Under conditions of high available short circuit currents, the limiter contacts 153 and 155 are open in as little a time as 0.2 milliseconds (one-eightieth of a cycle) from current initiation. As the contacts open an arc is formed between them. The arc between the limiting contacts is ordinarily extinguished within one millisecond by the structure and mechanism of this invention. It should be borne in mind that the mechanism described responds with the square of the magnitude of fault current so the larger the fault current, the faster the current limiting response. This accelerating responsiveness includes not only the speed of contact separation, but the effective responsiveness of the transverse magnetic field generated by field magnet structure 181 on the arc formed between contacts 153 and 155 which raises the arc voltage almost instantaneously to equal the voltage of the source by the means described (essentially by lengthening the arc through faster and greater contact separation plus bowing forwardly, plus cooling, all of which increase resistance of the arc and arc voltage). When the arc voltage equals the supply voltage, current can no longer continue to rise and is forced to transfer completely into the current limiting resistor 192 where its energy is dissipated.

The main breaker contacts 53 and 70 open within 0.004 seconds of fault current initiation, or within ¼ cycle of current flow at 60 cycles per second by which time the fault current has been fully shunted into current limiting resistor 192 and its energy dissipated. The main contacts 53 and 70 being opened, current has ceased to flow in the protected circuit in less than ¼ cycle or less than 4 milliseconds after appearance of the fault current above the threshold selected for the limiting section of the circuit breaker to become operable.

The effective current limiting responsiveness of the following combination, (1) speed of contact separation plus (2) increasing arc voltage to equal source voltage, occurs within about a millisecond or less by means of the invention described herein. This is important because symmetrical short circuit currents have their maximum growth rate during the first millisecond immediately following current zero. The current limiting means in accordance with this invention intercepts the short circuit current before it achieves a significant growth following current zero and shunts it into limiting resistance 192 having a positive temperature coefficient of resistance.

The mechanism as described can be mounted in compact cases to fit in standard panelboards. The compactness may be measured in terms of the ratio of short circuit amperes of interrupting rating to circuit breaker volume. The table below provides a reasonable illustration of the volumetric efficiency of short circuit interruption of the subject breaker. The volume of five representative circuit breakers is given in the second column and the interrupting rating shown in column 3. The first circuit breaker in the following table is the subject matter of this application.

|  | (1) Breaker Ampere Rating* | (2) Breaker Volume Cubic Inches (Typical Brkr.) | (3) Maximum Interrupting Rating, 480V, 3φ,K-Amps rms | (4) Volumetric Efficiency KVA/in.³ |
| --- | --- | --- | --- | --- |
| Instant Inven. | 100 | 138 | 100–200** | 347–694 |
| Representative | 100 | 85 | 25 | 142 |
| Circuit | 225 | 131 | 35 | 128 |
| Breakers | 400 | 273 | 35 | 61.5 |
| for | 1000 | 569 | 35 | 29.5 |
| comparison | 2500 | 1994 | 85 | 20 |

*This is the steady state current rating, all breakers listed are molded case circuit breakers.
**The 100 KA rating is an established but not a maximum figure.

An additional feature of this invention which aids in fitting a mechanism of high interrupting capacity within a circuit breaker of minimum volume, are plates 134 positioned forward of limiting contacts 153, 155 and blades 152, 154. One of the current limiting features of this invention is the rapid increase of arc voltage to equal source voltage. However, when high arc energy is applied to the air slab in the arc chamber, the air temperatue rises very rapidly which creates shock waves and large pressure gradients which must be dissipated. The devices which have attempted to limit current by generating high arc voltage have accordingly been bulky. They have had to include a large volume chamber in which to dissipate the shock waves and pressure gradients created by this means of current limiting. The invention herein combines arc voltage increase with other current limiting means, so the degrees of shock waves and pressure gradients are substantially less than in those devices which rely on the arc voltage means alone. Furthermore, plates 134 are particularly shaped, dimensioned and mounted as described above with respect to the arc, its path of movement, plus the direction of shock waves and air pressure gradients created, to intercept and effectively dissipate such forces without requiring a relatively large volume chamber.

The arc extinguishing material which coats the magnetic core structure 181 and lines the inside of the rectangular tube formed thereby and the inner sides of the conductor turns 188d and 199a to a large extent determines the rate of dielectric strength recovery across the contacts during and immediately following arc extinction. The dielectric strength recovery is essential to the current limiting process and is further aided by the magnetic field. The arc extinguishing material is selected in accordance with the disclosure of the above mentioned copending application, Ser. No. 364,596.

The resistor 192 should have a positively transformable resistance, capable of changing from an extremely low value to a much higher value after the arc across the contacts 153 and 155 is extinguished and the total current is forced to flow through the resistor and bypass the contacts. The transformation of the resistance increases the circuit power factor, aids interruption, and limits the "through" $i^2t$ (product of the square of the current and the time) factor of the short circuit.

Various modifications may be made in the structure shown and described without departing from the spirit of the invention and scope of the attached claims.

I claim:

1. An electric circuit breaker comprising a molded case, a molded movable contact blade mounting member pivotally mounted in the case, and a movable contact blade mounted in the mounting member, said movable contact blade including a tapered mounting tongue portion tapering to one end thereof, said tapered mounting tongue portion extending completely through the mounting member from one side, the said one end being staked to a retaining plate on the opposite side.

2. An electric circuit breaker as claimed in claim 1 wherein the circuit breaker is a multipole circuit breaker and the mounting member is an elongated blade crossbar having a plurality of said movable contact blades mounted therein in spaced apart relationship, the said tapered mounting tongue portion of each extending completely through the crossbar from one side and being staked to a retaining plate on the opposite side.

3. An electric circuit breaker as claimed in claim 2 including a reinforcing metallic insert molded in the blade crossbar, said metallic insert extending longitudinally within said elongated crossbar, and spaced apart openings in said metallic insert to receive therethrough respective ones of said tapered mounting tongue portions of said contact blades which extend through said crossbar.

* * * * *